(12) United States Patent
Vangsy et al.

(10) Patent No.: US 8,572,926 B2
(45) Date of Patent: Nov. 5, 2013

(54) LATTICE TOWER AND AN ERECTION METHOD FOR A WIND TURBINE WITH A LATTICE TOWER

(75) Inventors: Bent Vangsy, Silkeborg (DK); Mogens Christensen, Silkeborg (DK)

(73) Assignee: Gamesa Innovation & Technology, S.L., Sarriguren (ES)

( * ) Notice: Subject to any disclaimer, the term of this patent is extended or adjusted under 35 U.S.C. 154(b) by 0 days.

(21) Appl. No.: 12/532,999

(22) PCT Filed: Mar. 26, 2008

(86) PCT No.: PCT/ES2008/070058
§ 371 (c)(1),
(2), (4) Date: Sep. 25, 2009

(87) PCT Pub. No.: WO2008/119863
PCT Pub. Date: Oct. 9, 2008

(65) Prior Publication Data
US 2010/0083604 A1    Apr. 8, 2010

(30) Foreign Application Priority Data
Mar. 29, 2007   (ES) .................................. 200700832

(51) Int. Cl.
*E04G 21/00* (2006.01)

(52) U.S. Cl.
USPC ...... 52/745.18; 52/40; 52/651.01; 52/651.07; 52/848

(58) Field of Classification Search
USPC ............... 52/651.01, 651.05, 651.07, 745.09, 52/745.11, 745.18, 745.17, 40, 831, 834, 52/835, 848
See application file for complete search history.

(56) References Cited

U.S. PATENT DOCUMENTS

| 1,669,319 | A | * | 5/1928 | Bennethum | 184/4 |
|---|---|---|---|---|---|
| 2,210,407 | A | * | 8/1940 | Henry | 52/114 |
| 2,268,796 | A | * | 1/1942 | Brauer | 52/120 |
| 2,364,851 | A | * | 12/1944 | Johansen | 52/119 |
| 3,715,852 | A | | 2/1973 | Koga et al. | |
| 4,469,956 | A | * | 9/1984 | D'Amato | 290/55 |
| 4,590,718 | A | * | 5/1986 | Angeloff | 52/116 |
| 4,598,509 | A | * | 7/1986 | Woolslayer et al. | 52/118 |
| 4,885,893 | A | * | 12/1989 | Wasterval et al. | 52/745.18 |

(Continued)

FOREIGN PATENT DOCUMENTS

| CA | 2 418 021 | 8/2004 | |
|---|---|---|---|
| DE | 26 46 353 | 4/1978 | |
| DE | 28 06 081 | 8/1979 | |
| WO | WO 2006004417 A1 * | 1/2006 | ............ E04H 12/10 |

*Primary Examiner* — Brian Glessner
*Assistant Examiner* — Adam Barlow
(74) *Attorney, Agent, or Firm* — Ladas & Parry LLP

(57) ABSTRACT

A method of erecting a wind turbine comprising the following steps: Providing the hub (9), the blades (11), the nacelle (13) and a lattice tower (15) comprising first and second sections (21, 27) pivotally connected along an axis (17) at a height H, in which the tower lower part, below height H, is composed by the second section (27), including the tower lower and upper legs (31, 33) and a first part (23) of the first section (21) and in which the tower upper part, above height H, is composed by a second part (25) of the first section (21). Assembling on ground the wind turbine, with the nacelle (13) resting on a carrier (19). Raising the second section (27) and fixing the upper legs (33) to second foundation corners (43). Raising the first section (21) and fixing its first part (23) to the second section (27).

7 Claims, 1 Drawing Sheet

(56) References Cited

U.S. PATENT DOCUMENTS

| | | | |
|---|---|---|---|
| 5,213,470 A * | 5/1993 | Lundquist | 416/9 |
| 6,782,667 B2 * | 8/2004 | Henderson | 52/116 |
| 6,955,025 B2 * | 10/2005 | Dehlsen et al. | 52/745.17 |
| 7,218,013 B2 * | 5/2007 | Platt | 290/55 |
| 2002/0095878 A1 | 7/2002 | Henderson | |
| 2004/0045226 A1 | 3/2004 | Dehlsen et al. | |
| 2007/0175134 A1 | 8/2007 | Christenson | |
| 2008/0028715 A1 * | 2/2008 | Foss et al. | 52/651.01 |

* cited by examiner

US 8,572,926 B2

LATTICE TOWER AND AN ERECTION METHOD FOR A WIND TURBINE WITH A LATTICE TOWER

FIELD OF THE INVENTION

The present invention relates generally to a lattice tower and to an erection method of a wind turbine with a lattice tower and particularly to a lattice tower designed for allowing an erection method of the wind turbine that does not need a large crane.

BACKGROUND

The towers currently used for supporting wind turbines having capacities up to 750 Kw, either lattice towers or tubular towers, are usually erected in sections by a crane and assembled in the vertical position, joining each section of the tower to the adjacent tower sections by means of bolted connections. The nacelle and the rotor are then mounted on top of the vertically oriented tower using cranes.

As the tower height increase, the costs of the installation of wind turbines also increase. The large cranes that are needed involve high transportation and rental costs. On the other hand the size of large cranes involve spatial requirements on the installation site that may be difficult to comply with.

The prior art shows a number of proposals for erecting wind turbine without the use of large cranes such as the following.

US 2002/0095878 discloses a tower constructed of telescopic sections with the lowermost section having an edge portion pivotally connected to a foundation to enable the tower sections to be transported to the site of installation. The tower sections are assembled at the installation site in a nested relationship, each within the adjacent lower tower section. The nacelle and the rotor are mounted on the upper end of the uppermost tower section and the nested tower sections are then tilted upwardly to a vertical position. After the tower is tilted to its vertical position and securely connected to the foundation, the telescopic tower sections are vertically extended to position the wind turbine in a vertically elevated position.

US 2004/0045226 discloses a tower divided into an upper section with a tower top and a lower section with a tower bottom. The sections are hinged together. The lower section is hinged to a tower base. A telescoping crane is attached to a lift point on the lower section. The crane is extended to lift the sections to the vertical position with the lower section resting on the base and the tower top of the upper section near ground level. The wind turbine drivetrain is attached to the tower top end using a small ground crane while the tower top of the upper section is near ground level. The telescoping crane is attached to another lift point on the upper section to partially lift the upper section, which is supported in this position. The telescoping crane is relocated and reattached to the lift point on the upper section. The telescoping crane is fully extended to raise the upper section and the wind turbine drive train to vertical above the lower section.

CA 2418021 discloses a tower comprising a plurality of pivotally interconnected tower tubular sections, and a tower erection method not requiring the use of a crane. The tower tubular sections are assembled at the ground level of the installation site by interconnecting the adjacent sections with hinges, with the base tower section temporarily hinged to the tower foundation. Winch assemblies secured to the tower foundation are activated to pull on winch cables attached to the hinged tubular tower sections to lift and tilt the tubular tower sections upwardly, in sequence using, in part, the ground surface vertical forces counter-acting the weight of the tower at the contact points with the ground.

The wind industry demands constantly wind turbine towers allowing erecting methods of wind turbines without using larger cranes and the present invention is intended to satisfy said demand.

SUMMARY OF THE INVENTION

It is an object of the present invention to provide a lattice tower suitable for an erecting method of the whole wind turbine that do not need using large cranes.

This object of the present invention is met by a lattice tower comprising a first section, composed of a first part and a second part, and a second section pivotally connected along an axis at a height H; the lower part of the lattice tower, below height H, being composed by the second section, that includes the legs of the lattice tower, and the first part of the first section; and the upper part of the lattice tower, above height H, being composed by the second part of the first section.

It is another object of the present invention to provide an erecting method of a wind turbine with a lattice tower that do not need using large cranes.

This and other objects of the present invention are met by a method comprising the following steps:

a) providing the hub, the blades, the nacelle and a lattice tower comprising a first section, composed of a first part and a second part, and a second section pivotally connected along an axis at a height H; the lower part of the lattice tower, below height H, being composed by the second section, that includes the legs of the lattice tower, and the first part of the first section; and the upper part of the lattice tower, above height H, being composed by the second part of the first section;

b) assembling on ground the whole wind turbine, with the rotor blades placed parallels to the ground and the nacelle resting on a carrier, and hinging the lattice tower lower legs on first foundation corners;

c) raising the second section and having the lattice tower upper legs fixed to second foundation corners;

d) raising the first section and having its first part fixed to the second section.

One advantage of the present invention is that the division of the tower in the above mentioned two sections in combination with the use of small, cheap, and flexible truck based cranes for erecting the tower contribute to reduce the costs of wind turbines.

Other features and advantages of the present invention will be understood from the following detailed description of illustrative and by no means limiting embodiments of its object in relation with the enclosed drawings.

DETAILED DESCRIPTION OF PREFERRED EMBODIMENTS

Figure 1:
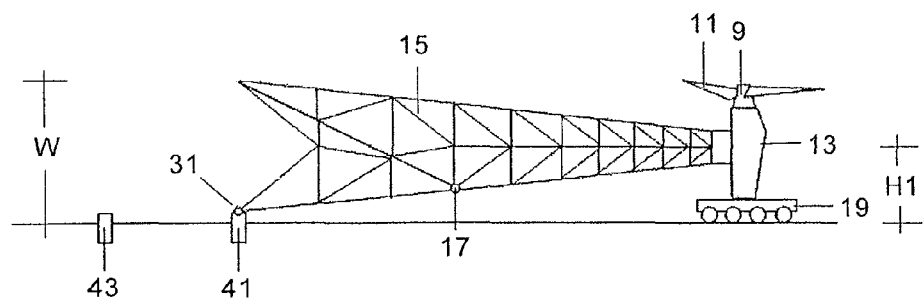
FIG. 1 is a schematic sectional view of a wind turbine assembled on ground according to this invention.

A typical wind turbine comprises a tower 15 supporting a nacelle 13 housing means for converting the rotational energy of the wind turbine rotor into electrical energy.

The wind turbine rotor comprises a rotor hub 9 and one or more blades 11.

The rotor hub 9 is connected to the main shaft, the gearbox and the generator of the wind turbine for transferring the torque generated by the rotor to the generator and increase the shaft speed in order to achieve a suitable rotational speed of the generator rotor.

In a first embodiment of this invention, the wind turbine tower is a lattice tower 15 formed with steel profiles which is structured in two independent sections 21, 27 pivotally connected along an horizontal axis 17 at a height H.

In a preferred embodiment H is comprised between 20-80% of the tower height Ht.

The lower part of the lattice tower 15, below height H, is composed by the second section 27 that include the legs 31, 33 of the lattice tower 15 and the first part 23 of the first section 21 having bottom corners 35.

In a preferred embodiment the width W of the base of the tower 15 between upper and lower legs 33, 31 is comprised between 10-40% of Ht.

The upper part of the lattice tower 15, above height H, is composed by the second part 25 of the first section 21.

The lattice tower 15 also includes a tubular top part 29 for facilitating the connection with the nacelle 13.

In a preferred embodiment the angle of inclination A between a vertical plane and an hypothetical plane covering the face of the tower 15 comprising the lower legs 31 is comprised between 3-45 deg.

The design of the lattice tower 15 in two independent sections 21, 27 pivotally connected, is intended to facilitate the tower erection and also for allowing that the wind turbine could be brought to the ground in a reasonable time in occasion of typhoons or other dangerous wind events.

Once the tower is erected both sections 21, 27 are joined so that the tower can behave as an structural unit for complying with the structural requirements for supporting the wind turbine.

In the case of dangerous wind events, the design of the tower in two articulated section 21, 27 allows that the wind turbine could be brought to the ground in a reverse partial sequence of the operations for erecting the tower.

In a first embodiment of this invention the erecting method of a wind turbine comprises the following steps.

The first step includes all the operations needed for the provision and transport of all wind turbine components to the site where the wind turbine will be erected.

The lattice tower 15 is transported as steel profiles on a number of trucks. In this way only weight and not dimensions are limiting normal road transport making the transport cheaper. The tower top 29 is a tubular steel section with height smaller than the diameter.

The nacelle 13 is transported on a truck positioned on the truck in normal horizontal position. In this invention, the term nacelle is used in a broad sense as a frame structure connected to the tower 15 and to the rotor hub 9. In particular, the nacelle may not include the generator which may be transported and installed separately.

The rotor hub 9 is transported on a truck alone or together with the generator.

The blades 11 are transported in a special transport frame. The number of blades 11 on one transport depends on the blade size, weight, and length. It may be decided to transport the blades in two parts to shorten the transport is frame.

In the second step of the erecting method of a wind turbine according to this invention, as illustrated in FIG. 1, the wind turbine is assembled on ground with the rotor blades 11 placed parallels to the ground and the nacelle 13 resting on a carrier 19 and its lower legs 31 are hinged on first foundation corners 41. The nacelle 13 is in vertical position and it is joined to the top part 29 of the lattice tower 15.

This second step comprises the following sub-steps.

a) Assembling the lattice tower 15.

The lattice tower 15 is assembled according to the above-mentioned design in almost horizontal position and the assembled tower is provisionally supported at a height H1 in its top that suits the nacelle 13 yaw bearing when the nacelle is in vertical position for its subsequent connection.

Parts of the lattice structure can be assembled horizontally on the ground and afterwards connected into the tower if there are available means for lifting the pre-assembled parts in position.

When the upper legs 33 and the bottom corners 35 of the first part 23 of the first section 21 are assembled is advantageous to connect to them the means 45, 47 that will be used in the raising steps. As seen on FIGS. 2 and 3 the connection points in the upper legs 33 and bottom corners 35 will be located high above if connection is not made in time.

b) Connecting the nacelle 13 to the lattice tower 15.

The nacelle 13 is coming to the site on a truck or bogie in horizontal position. To connect it to the lattice tower 15 top, it must be placed in vertical position in a carrier 19 using suitable means. In right position, the nacelle 13 is bolted to the top part 29 of the lattice tower 15.

The carrier 19 may be an special carrier or the same truck or bogie who brought the nacelle 13 to the site.

c) Connecting the rotor hub 9 to the nacelle 13.

The rotor hub 9 is lifted to top of the nacelle 13 and bolted to the main shaft.

d) Connecting the blades 11.

The blades 11 are assembled (if they arrive in two pieces), lifted in position at the rotor hub 9 by suitable means, such as cranes, and bolted to the blade bearings of the rotor hub 9.

Figure 2:
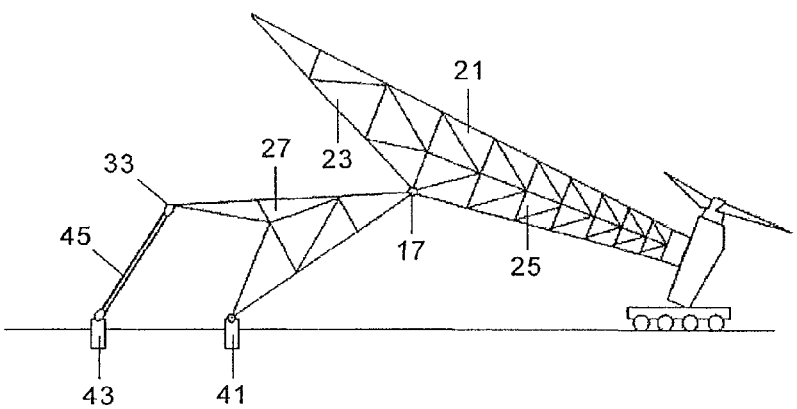
FIG. 2 is a schematic sectional view of the wind turbine in the first raising step of the method according to this invention.

In the third step of the erecting method of a wind turbine according to this invention as illustrated in FIG. 2, the second section 27 of the lattice tower 15 is raised and its lattice tower upper legs 33 are bolted to second foundation corners 43.

The raising operation is done by means of a cable pulling device 45 cooperating with a winch on ground (not shown). The cable pulling device 45 comprises separated units for each upper leg 33.

The carrier 19 may be free to move in this step or may have moving means that can be used as additional lifting means of the lattice tower 15 in this step.

This step may require using complementary means. One of them is a removable moment absorbing tool to decrease the moment arising in the lower legs 31 when second section 27 is raised.

Another complementary means is a cable (not shown) connected to the pivotal axis 17 and to an anchor point (not shown) for controlling the movement of the tower immediately after the pivotal axis 17 is raised vertically above the first foundation corners 41, to which the lower legs 31 are hinged, when there is a risk that the upper legs 33 bump in the second foundation corners 43.

Figure 3:
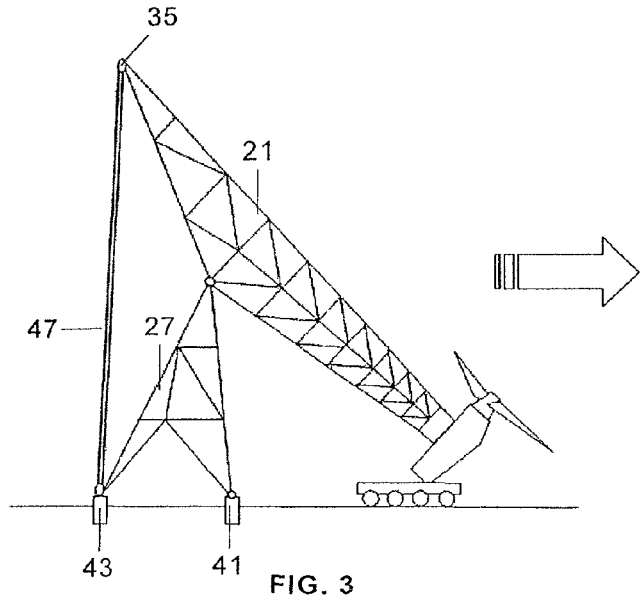
FIG. 3 is a schematic sectional view of the wind turbine in the beginning of the second raising step of the method according to this invention
Figure 4:
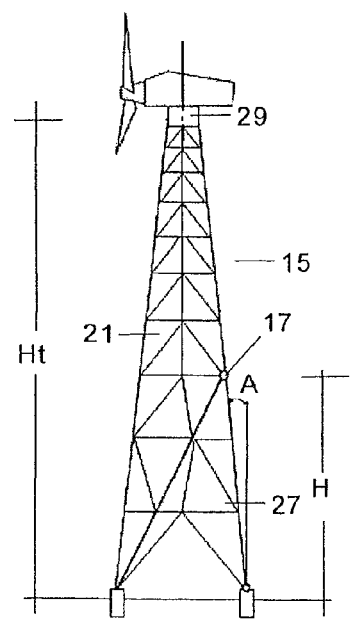
FIG. 4 is a schematic sectional view of the wind turbine in the erected position.

In the fourth step of the erecting method of a wind turbine according to this invention as illustrated in FIGS. 3 and 4 the first section 21 of the lattice tower 15 with the wind turbine connected at its top part 29 is raised and its first part 23 is fixed to the second section 27 of the lattice tower 15.

The raising operation is done by means of a cable pulling device 47 cooperating with a winch on ground (not shown). The cable pulling device 47 comprises separated units for each bottom corner 35.

Like the third step, the fourth step may require using complementary means, in particular a cable (not shown) connected to the nacelle 13 and to an anchor point (not shown) for controlling the last part of the movement of the first section 21 of the lattice tower 15.

If the bottom corners 35 reach the lower part of the lattice tower 15 it is advantageous that they are bolted to the second foundation corners 43.

In any event the first and second sections 21, 27 shall be joined, i.e. through bolted joints along the lines from the second foundation corners 43 to the pivotal axis 17.

As mentioned before the design of the lattice tower 15 in two independent sections 21, 27 pivotally connected allows that wind turbine could be brought to the ground in a reasonable time in occasion of typhoons or other dangerous wind events. A suitable method for achieving such objective will comprise the operations needed for having the wind turbine in the position illustrated in FIG. 3.

Although the present invention has been fully described in connection with preferred embodiments, it is evident that modifications may be introduced within the scope thereof, not considering this as limited by these embodiments, but by the contents of the following claims.

The invention claimed is:

1. A method of erecting a wind turbine, comprising the following steps:
   a) providing a hub (9), some blades (11), a nacelle (13), and a lattice tower (15) comprising a first section (21) composed of a first part (23) and a second part (25), and a second section (27) pivotally connected along an axis (17) at a height H, a lower part of the lattice tower (15), below height H, being composed by the second section (27), that includes lower and upper legs (31, 33) of the lattice tower (15), and the first part (23) of the first section (21); and an upper part of the lattice tower (15), above height H, being composed by the second part (25) of the first section (21);
   b) assembling on ground the wind turbine, with the blades (11) placed parallel to the ground and the nacelle (13) resting on a carrier (19), and hinging the lattice tower lower legs (31) on first foundation corners (41);
   c) raising the second section (27) and having the lattice tower upper legs (33) fixed to second foundation corners (43); and
   d) raising the first section (21) and having its first part (23) fixed to the second section (27).

2. The method of erecting a wind turbine according to claim 1, wherein in step c), the second section (27) is raised by means of a cable pulling device (45) cooperating with a winch on the ground.

3. The method of erecting a wind turbine according to claim 2, wherein said cable pulling device (45) includes separated units installed in each upper leg (33).

4. The method of erecting a wind turbine according to claim 2, wherein raising means of the second section (27) also include moving means of said carrier (19).

5. The method of erecting a wind turbine according to claim 1, wherein in step d), the first section (21) is raised by means of a cable pulling device (47) cooperating with a winch on the ground.

6. The method of erecting a wind turbine according to claim 5, wherein said cable pulling device (47) includes separated units installed in bottom corners (35) of the first part (23) of the first section (21).

7. The method of erecting a wind turbine according to claim 1, wherein in steps c) and d), cables extended from the tower to anchor points are used during the raising operations.

\* \* \* \* \*